United States Patent
Adi et al.

(10) Patent No.: US 7,933,794 B2
(45) Date of Patent: Apr. 26, 2011

(54) METHOD AND SYSTEM FOR ACTIVE MONITORING OF DEPENDENCY MODELS

(75) Inventors: Asaf Adi, Kiryat Ata (IL); Opher Etzion, Haifa (IL); Dagan Gilat, Haifa (IL); Guy Sharon, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 1750 days.

(21) Appl. No.: 10/697,184

(22) Filed: Oct. 30, 2003

(65) Prior Publication Data

US 2005/0096966 A1    May 5, 2005

(51) Int. Cl.
G06F 17/30 (2006.01)
G06F 17/00 (2006.01)
G06Q 10/00 (2006.01)

(52) U.S. Cl. .................. 705/10; 706/47; 705/300

(58) Field of Classification Search .............. 705/1, 8, 705/9, 10, 348; 706/45–47; 717/101, 103
See application file for complete search history.

(56) References Cited

U.S. PATENT DOCUMENTS

| | | | | |
|---|---|---|---|---|
| 5,369,570 | A * | 11/1994 | Parad | 705/8 |
| 5,446,885 | A * | 8/1995 | Moore et al. | 707/103 R |
| 6,341,279 | B1 * | 1/2002 | Nye | 707/3 |
| 6,381,580 | B1 * | 4/2002 | Levinson | 705/8 |
| 6,604,093 | B1 * | 8/2003 | Etzion et al. | 706/47 |
| 6,847,970 | B2 * | 1/2005 | Keller et al. | 707/100 |
| 6,983,321 | B2 * | 1/2006 | Trinon et al. | 709/224 |
| 2003/0055695 | A1 * | 3/2003 | Mori et al. | 705/7 |
| 2003/0204491 | A1 * | 10/2003 | Botzer et al. | 707/3 |
| 2004/0024767 | A1 * | 2/2004 | Chen | 707/100 |
| 2004/0128645 | A1 * | 7/2004 | Srivastava | 717/101 |

OTHER PUBLICATIONS

James Bailey, Alexandra Poulovassilis, Peter T. Wood: "An Event-Condition-Action Language for XML". (Copyright May 7-11, 2002).*
Eric S.K. Yu and John Mylopoulos: "AI Model for Business Process Reengineering". (Copyright 1996 IEEE).*
James Bailey and Alexander Poulovassilis: An abstract interpretation framework for termination analysis of active rules. (Springer-Verlag Berlin Heidelberg © 2000).*
Huaxin Zhang and Eleni Stroulia: "Babel: An XML-Based application integration framework". (Springer-Verlag Berlin Heidelberg © 2002).*
H. Herbst, G. Knolmayer, T. MYrach and M. Schlesinger: "The specification of business rules: a comparison of selected methodologies". (1994).*
C. Gill, T. Harrison, and C. O'Ryan "Using the real-time event service" (www.cs.wustl.edu/~schmidt/events_tutorial.html) (Dec. 1998).*
Kevin Crowston: "A Taxonomy of Organizational Dependencies and Coordination Mechanisms".*

* cited by examiner

*Primary Examiner* — Jamisue A Plucinski
*Assistant Examiner* — Bob Chumpitaz

(57) ABSTRACT

A method and system for ADI (Active Dependency Integration) provides an information and execution model for the description of enterprise systems, solutions and services. It supports the modeling of various entities and business components (e.g. event, disk, application, activity, business process), the information that is associated with them (i.e. schema), and the semantic relationships among them (e.g. dependency between a business component and other business components and events). The ADI execution model monitors and manages business components and the relationships among them. It automatically updates business components information in response to events occurrences and constraints violations, and propagates changes in business components to other business components according to the dependency model.

11 Claims, 6 Drawing Sheets

METHOD AND SYSTEM FOR ACTIVE MONITORING OF DEPENDENCY MODELS

FIELD OF THE INVENTION

This invention relates to event-driven systems and, in particular, to a method and system for modeling and managing business components and their inter-relationships.

BACKGROUND OF THE INVENTION

Reactive applications relate to a class of applications that are event-driven and configured to operate upon detection of events. The exact timing and content of such events are not usually known in advance. Many tools in different areas have been built to detect events, and to couple their detection with appropriate actions. These tools exist in products that implement active databases, event management systems, the "publish/subscribe" mechanism, real-time systems and similar products. Most current reactive systems respond to a single event. Many of these tools are based on Event-Condition-Action (ECA) rules and provide a language of operators for specifying these rules. Some of these languages enable complex events to be defined as the composition of multiple simple events, for example, successive withdrawals from one or more bank accounts. Some languages also allow a complex event to be composed of a number of subsidiary complex events. In addition, a particular order or other timing constraints on the component events may be specified.

Once the complex event has been detected, there may be one or more conditions that qualify the event, for example, that the amounts of the withdrawals be greater than a specified threshold. If the conditions are satisfied, then an action is triggered, such as alerting the bank's security manager of a possible fraud. In the context of the present patent application, a specified composition of events together with the conditions attached to these events is referred to as a situation. Tools for specification of ECA rules generally make a clear separation between the event and condition portions of the rule. Thus when a computer evaluates a given situation on the basis of such tools, it first determines that an instance of the event has occurred, i.e., that all of the component events have occurred in the proper order, and only then evaluates the conditions associated with the event.

U.S. Pat. No. 6,006,016 (Faigon et al.) issued Dec. 21, 1999 discloses a method and apparatus for correlating faults in a networking system. A database of fault rules is maintained along with associated probable causes, and possible solutions for determining the occurrence of faults defined by the fault rules. The fault rules include a fault identifier, an occurrence threshold specifying a minimum number of occurrences of fault events in the networking system in order to identify the fault, and a time threshold in which the occurrences of the fault events must occur in order to correlate the fault. Occurrences of fault events in the networking system are detected and correlated by determining matched fault rules which match the fault events and generating a fault report upon determining that a number of occurrences for the matched fault rules within the time threshold is greater than or equal to the occurrence threshold for the matched fault rules.

In such a system a fault constitutes an event that must be trapped and monitored. Only those faults whose frequency exceeds a certain threshold are of interest.

U.S. Pat. No. 6,604,093 (Etzion et al.) published Aug. 5, 2003, entitled "Situation awareness system" and commonly assigned to the present assignee discloses a situation management system that provides tools for defining intervals during which a given situation is meaningful and for detecting and reacting to the occurrence of the situation during such intervals. Such an interval is referred to as a "lifespan" and begins with an initiating event, or initiator, and ends with a terminating event, or terminator. The situation management system disclosed in U.S. Pat. No. 6,604,093 enables manipulation of the initiator and terminator, such as by attachment of conditions to the initiating and terminating events. It also allows multiple, interrelated lifespans to run concurrently, with predefined relations between the lifespans. The system is described in U.S. Pat. No. 6,604,093 is an off-the-shelf situation awareness unit that is sold under the trademark AMIT by International Business Machines Inc. of Armonk, N.Y., USA. AMIT is an acronym for "Active Middleware Technology."

Thus, such a situation management system enables temporal relations among events to be defined and detected simply and flexibly and serves as a general purpose vehicle for implementing a vast range of different applications. The events that are processed by such a system and the manner in which they are derived depends on the application that is implemented using the system, it being understood that the system described in U.S. Pat. No. 6,604,093 operates independently of the application even though it serves as a kernel to the application.

There appears to be no suggestion in the prior art to provide an execution model for the description of enterprise systems, solutions and services that supports the modeling of various entities and business components (e.g. event, disk, application, activity, business process), the information that is associated with them (i.e. schema), and the semantic relationships among them (e.g. dependency between a business component and other business components and events).

SUMMARY OF THE INVENTION

It is therefore an object of the invention to provide an improved information and execution model for the description of enterprise systems, solutions and services.

It is a particular object to provide such a model that supports the modeling of various entities and business components (e.g. event, disk, application, activity, business process), the information that is associated with them (i.e. schema), and the semantic interrelationships (e.g. dependency between a business component and other business components and events).

These objects are realized in accordance with a broad aspect of the invention by a computer-implemented method for automatically updating business components information, and propagating changes in business components to other business components according to a dependency model, said method comprising:

applying rules that describe how an event affects a business component and that describe when a change in a business component triggers an event to create a business dependency model modeling business components and dependencies between them including compound dependencies, said dependency model defining event types, business component types, and dependency types associated with a business domain, said dependency model further defining how information is propagated from one business component to another; and responsive to one or more events and/or and constraints violations, automatically updating business components information, and propagating changes in business components to other business components according to the dependency model.

In such a method the computation of new situations based on new events may be carried out by an off-the-shelf situation manager such as described in U.S. Pat. No. 6,604,093. However, the automatic updating of business components information and the propagation of changes in business components to other business components according to the dependency model is external to such the situation manager although it utilizes the results thereof. For convenience, the salient features of U.S. Pat. No. 6,604,093 will be described, although it is to be understood that this system is only one way to implement the present invention and other situation awareness systems having similar functionality may be used instead.

The modeling system is suitable for multiple domains and can be deployed in any domain after minor configuration. Business components types are defined externally to the code used by the modeling system. Dependency types can be defined easily using conditions on business component state, cardinality and ordering. The semantics of new dependency types may be defined using AMIT rules externally to the code used by the modeling system. Examples for applications domain suitable for modeling by the modeling system according to the invention include E-business management, Work-flow management, System management, and Web service management.

The modeling system is able to model all enterprise activities and components including objects, data, tasks, applications, resources, and business processes and to define new dependency types and their semantics. Dependency composition may be used to enhance the semantics of defined dependency types and rules may be defined that describe business behavior.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Seeing that according to a preferred embodiment the present invention operates within the context of the situation awareness system disclosed in U.S. Pat. No. 6,604,093 and uses a modeling language described therein, a brief description of the situation awareness system will be given first. This description is not intended to explain how the situation awareness system operates internally, since an understanding thereof is not essential to the present invention; but rather is intended to describe those features that are essential to use of the system for running external applications.

Figure 1:
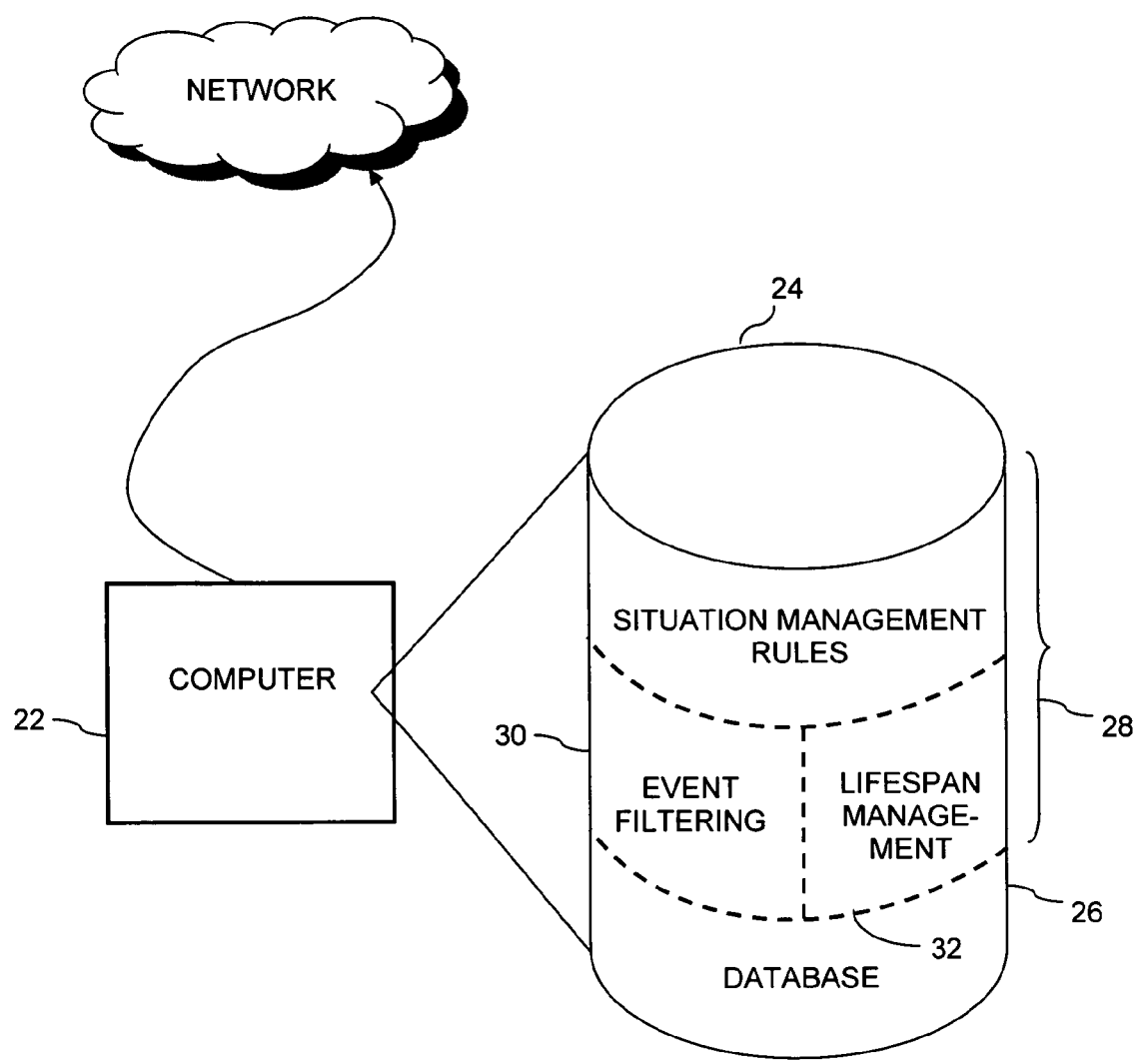
FIG. 1 is a schematic illustration of a prior art situation management system that may be used to process events in accordance with a preferred embodiment of the present invention.

FIG. 1 is a schematic illustration of a system 20 for situation management, in accordance with a preferred embodiment of the present invention. The system comprises a processor 22, typically a general-purpose computer programmed with suitable software, and a memory 24. Although memory 24 is shown in FIG. 1 as a local data store of the computer, the memory may also be maintained at a site remote from the computer, on a server or shared disk system, for example, and accessed by processor 22 via a network. Software enabling processor 22 to carry out its situation management functions may be downloaded to the processor over the network or, alternatively, it may be furnished on tangible media, such as CD-ROM.

Memory 24 stores situation management rules 28, according to which processor 22 is programmed to detect and react to situations, i.e., to specified combinations of events and conditions. These situations may arise, for example, owing to changes in a database 26 maintained in memory 24. Alternatively or additionally, the situations may be associated with other events regarding which processor 22 receives notification, typically via a network connection, or with events input by a user or occurring internally to the processor. Rules 28 are defined by a user of processor 22 using rule definition operators and other situation management tools associated with system 20. These tools preferably include event filtering operators 30 and lifespan management tools 32, which are described in detail below.

Figure 2:
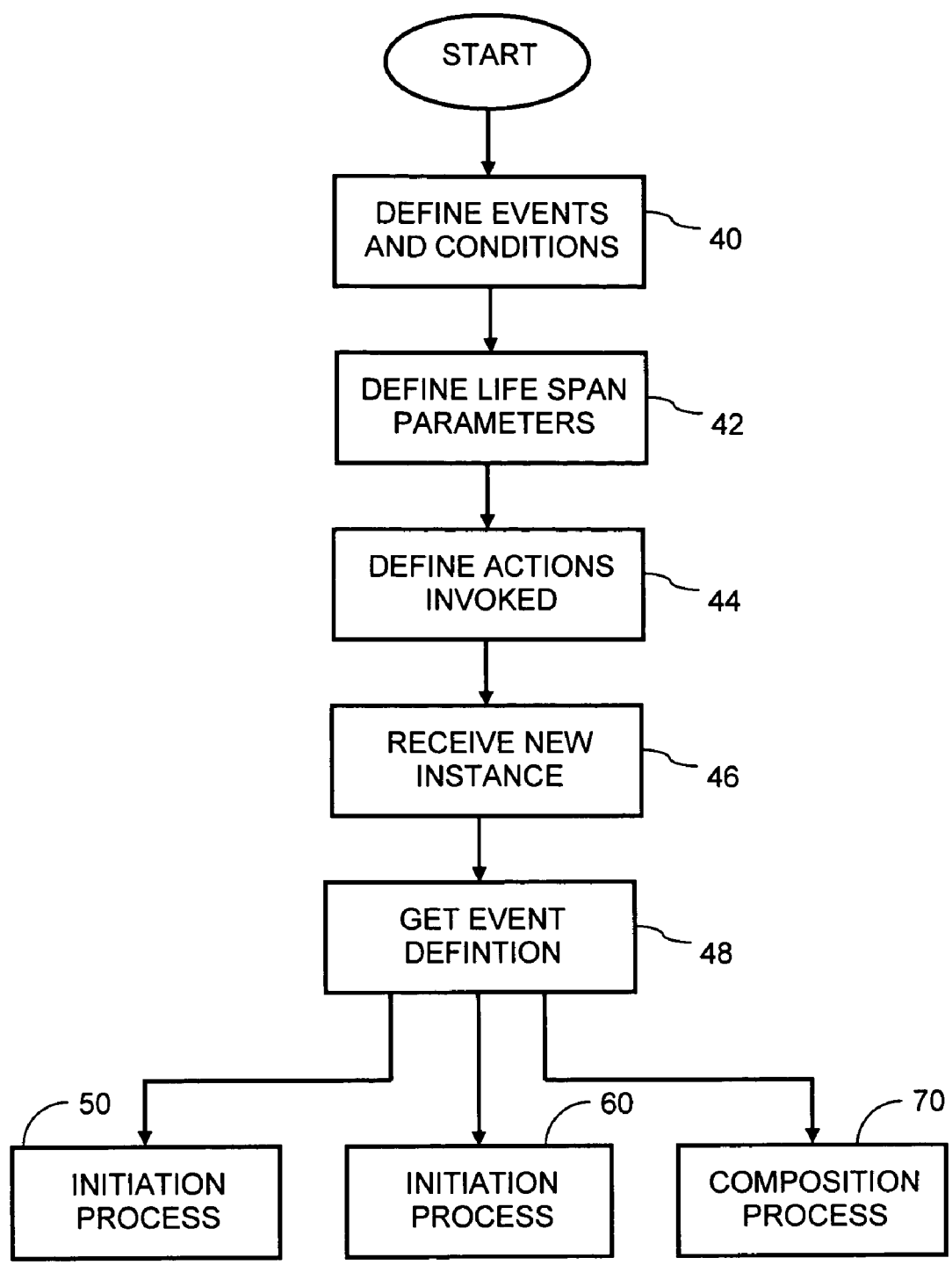
FIG. 2 is a flow chart that schematically illustrates a prior art method for situation management that may be used to process events in accordance with a preferred embodiment of the present invention.

FIG. 2 is a flow chart that schematically illustrates a method of situation management using system 20 and that may be used to implement a business application in accordance with a preferred embodiment of the present invention. The method includes definition of applicable rules, based on situations, lifespan parameters and actions defined at steps 40, 42 and 44, respectively. While these steps are shown, for the sake of simplicity of illustration, as separate, sequential functions, in practice they are generally performed together, in combination. After the rules have been defined, the system then receives event instances, at an instance reception step 48, and applies the rules to process the events in run-time at steps 48, 50, 60 and 70.

Table I below illustrates the syntax by which a situation is defined, in accordance with a preferred embodiment of the present invention:

TABLE I

| situation definition |
|---|
| Situation [Name] [General properties] |
| Operator |
|     From [operand list] |
|     Where [condition] |
|     Threshold [condition] |
| Key-by [key] |
| Initiators [list of initiator-expressions] |
| Terminators [list of terminator-expressions] |
| Attributes [attribute list] |

The elements of this syntax are described in detail below. Briefly, each situation has a name and general properties, such as a detection mode to be applied in detecting the situation (for example, immediate or deferred). The situation arises when a complex event occurs, as determined by an operator, which composes specified events, or operands. Table II, below, presents a list of such operators. "Where" and "threshold" specify conditions to be applied to certain attributes of the operand events. If a threshold condition is not satisfied, the event is not counted in composing the situation. "Where" conditions are generally applied to the situation as a whole, after the complex event has been composed. "Key-by" designates an attribute that is to be used to match different events. The "initiators" and "terminators" define a lifespan in which the situation must take place. "Attributes" lists the attributes to be returned in this particular situation, since not all of the attributes associated with the events involved in the situation are necessarily of interest.

Returning now to FIG. 2, at step 40, complex events are defined by means of event composition operators, which are applied to event types e1, e2, . . . , en. The event types typically refer to simple events, but the operators may also be applied to complex events. A list of operators is presented below in Table II, but it will be understood that this list is not exhaustive, and further operators may be added. It will also be noted that many of these event types are defined with reference to lifespans, which are preferably specified in a manner described below, with reference to step 42.

TABLE II complex event compositions

| | |
|---|---|
| all(e1, . . . , en) | Occurs when an instance of each of the events in the list has been detected. |
| before(e1, . . . , en) | Occurs when an instance of each of the events in the list has been detected, such that detection time(e1) < detection time(e2) < . . . < detection time(en). |
| atleast(N, e1, . . . , en) | Occurs when at least N instances of the specified events are detected. Optionally, only a single instance of each different event is counted. |
| nth(N, e1, . . . , en) | Occurs when the Nth instance of the specified events is detected. Optionally, only a single instance of each different event is counted. |
| atmost(N, e1, . . . , en) | Occurs when the number of instances of the specified events detected in a specified lifespan is less than or equal to N. This event is detected upon lifespan termination. Optionally, only a single instance of each different event is counted. |
| any(e1, . . . , en) | Occurs when any instance of the specified events is detected. |
| first(e1, . . . , en) | Occurs once during a specified lifespan, when the first instance of any of the specified events is detected, and returns the detected instance. |
| last(e1, . . . , en) | Occurs at the termination of a specified lifespan, returning the last detected instance of any of the specified events. |
| not(e1, . . . , en) | Occurs at the termination of a specified lifespan if there is no instance of any of the specified events that has occurred within the lifespan. |
| unless(e1, e2) | Occurs at the termination of a specified lifespan if there is an instance of e1 and no instance of e2 within the lifespan. |
| every(T) | Occurs every T time-units from the start of a specified lifespan. An instance of the event every(T) is generated irrespective of whether any other events occur during the lifespan. |
| at(e, T, MULT) | Occurs T time units after the occurrence of an instance of e. MULT is a decision variable that determines what to do if another instance of e occurs within time T of the previous instance. |

In addition to defining the composition of events that are to be detected, step 40 also includes defining the content of these events, i.e., the conditions that are to be applied in determining whether system 20 should react to the occurrence of the specified events. As noted above, the combination of the event composition with event content, or condition, defines a situation. The conditions may be applied to the detected events either immediately or deferred to the end of a specified lifespan, as specified in the general properties of the situation. Table III presents an example useful in understanding the distinction between these two alternatives:

TABLE III events and conditions

| Time | Event type | Event instance ID | Attribute values |
|---|---|---|---|
| 1 | E1 | e11 | x = 5 |
| 2 | E2 | e21 | y = 7 |
| 3 | E2 | e22 | y = 4 |
| 4 | E1 | e12 | x = 12 |
| 5 | E1 | e13 | x = 4 |
| 6 | E2 | e23 | y = 11 |
| 7 | E2 | e24 | y = 10 |
| 8 | e2 | e25 | y = 8 |
| 9 | e2 | e26 | y = 7 |
| 10 | e2 | e27 | y = 12 |

As shown in the table, two arbitrary events, e1 and e2, are defined, having respective attributes x and y. Assume a complex event is defined as before (e1,e2), with the condition that e1.x>e2.y. Over the lifespan defined by T=1, . . . , 10, there are 17 different compositions of an event e1i with a subsequent event e2j that will be detected as satisfying before (e1,e2). On the other hand, only one such composition, (e11,e22), satisfies the condition that e1.x>e2.y. Therefore, the condition is preferably evaluated immediately, in order to save system 20 the burden of storing all of the combinations until the end of the lifespan. Alternatively, in some cases, it may be desirable to store all of the candidate events and delay the content processing. Other situation management tools known in the art process the conditions associated with events only after the entire event composition process is complete, and they do not offer this flexibility. However, such systems may also be used to process events in an application according to the present invention.

At step 42, initiators and terminators are defined for each of the lifespans to which situation detection is to be referred. Each of these initiators and terminators is itself an event, which may be either a simple or complex event and may have associated conditions, as well In other words, the initiator and terminator are also situations. Complex events used as initiators and terminators may be generated using the operators defined in Table II above. Furthermore, multiple instances of an initiator event can generate multiple, concurrent lifespans. Operators, referred to herein as correlation codes, are provided for defining how such multiple instances will be treated, as listed in Table IV.

TABLE IV correlation codes

| | |
|---|---|
| Add | After a first initiator, each additional instance of the initiator event starts a separate lifespan for the same situation, while existing lifespans remain active. |
| Ignore | Any additional instance of the initiator event is ignored until the first lifespan has been terminated. (This is the default mode.) |
| Replace | Any additional instance of the initiator starts a new lifespan, while the preceding lifespan is terminated. |

TABLE IV-continued correlation codes

| | |
|---|---|
| Override | Like replace, except that any situations that occurred during the preceding lifespan and whose processing was delayed, as described above, are discarded without detection. |

These correlation codes are used in writing the list of initiator-expressions in the syntax of Table I. For example, the expression "initiator e1 add, e2 ignore" in this syntax will cause a new lifespan to be added every time event e1 occurs, while a new lifespan will be added only at the first instance of event e2, while later occurrences of e2 will be ignored.

Terminator events are preferably parameterized in a similar fashion, and thus they may be applied differently to different lifespans. For example, when multiple lifespans of the same situation are open concurrently, a single terminator may terminate all or only some of them. Lifespans of different situations may also be grouped, or clustered, and terminated by a common terminator. It is also possible to define an expiration time for a given lifespan or group of lifespans, so that the lifespans end even in the absence of a terminator event.

More generally, a key may be defined for each lifespan, wherein the key is a combination of attributes such that for each distinct key value, a new lifespan is created. The key supports the ability of system 20 to match and partition events or lifespans by content. For example, consider the following events and associated attributes (listed as event: attributes) that might be used in managing a database of customer contacts:

Open-contact: new-contact, customer
Open-request: new-request, contact, priority
Assign-request: request, assigned agent
Reply-request: request, agent
Close-contact: closed-contact A key is defined for the purpose of matching events relating to a contact:

Key-contact open-contact.new-contact,
  open-request.contact, close-contact.closed-contact In order to group events that relate to the same contact, so as to define the lifespan of a given contact, for example, the events are filtered by their key value. In other words, a joint condition is imposed on the events that open-contact.new-contact, open-requested.contact, and close-contact.closed-contact all have the same value, i.e., that they all refer to the same contact.

The application of the operators listed in Table II is preferably further refined using quantifiers, which indicate, when multiple instances of a given event occur during a lifespan, which of the instances to select. The quantifiers include "first," "each" and "last." The use of these quantifiers is illustrated by an example shown in Table V.

TABLE V

USE OF event quantifiers

| Time | Event type | Event instance ID |
|---|---|---|
| 1 | e1 | e11 |
| 2 | e1 | e12 |
| 3 | e2 | e21 |
| 4 | e2 | e22 |
| 5 | e1 | e13 |
| 6 | e2 | e23 |

The operator "before (first e1,first e2)" will return (e11, e21) at time T=3. The situation may further be quantified by its general properties so that it returns this result either immediately, or only upon termination of the lifespan at T=7. On the other hand, "before (first e1,each e2)" will return (e11, e21), (e11,e22) and (e11, e23). It is also possible, however, to quantify the situation so that event instances are consumed after use. In this case, "before (first e1, each e2)" would return (e11,e21), (e12,e22) and (e13, e23). It may further be specified that instances that are skipped without being consumed are ignored, rather than saved for subsequent use. In this case, "before (first e1, each e2)" would return only (e11,e21) and (e13, e23), since e12 is initially skipped, leaving e22 with no match. Threshold conditions may also be applied to the events, as illustrated in Table I.

At step 44, the actions to be taken by system 20 for each situation in each corresponding lifespan are defined. The situations defined at steps 40, 42 and 44 are stored in tables, indexed by event type. Incoming events are evaluated against the table values, as described below. Upon completion of steps 40, 42 and 44, system 20 is prepared to receive and process events and react to the corresponding situations. At step 45, system 20 receives and begins processing of event instances in accordance with the rules that have been defined.

At step 48, each event instance that arrives is referred to a global event table, which maps the instance to a corresponding event type, and to an event definition table, which classifies the event type as an initiator, terminator and/or part of one or more composite events. The tables are part of a group of data structures that are defined for the purpose of situation and lifespan processing. These data structures, which are described further below, are listed in Table VI.

TABLE VI data structures

| | |
|---|---|
| *Global tables* | |
| Event table | Maps event descriptions to event types. |
| Key table | Maps key descriptions to keys. Each entry represents a different key, with its details for a certain situation. |
| Cluster table | Maps cluster descriptions to clusters. A cluster is a group of lifespans having the same key, referred to as their "global key." Each entry in this table represents a different cluster, with its details for a certain situation. |
| *Event definition - for each event type:* | |
| Initiator set | Set of initiators that depend on this event type. |
| Terminator set | Set of terminators that depend on this event type. |
| Sibling set | Set of composite events in which this type of event participates. |
| Operand list | List of the operands that are associated with this event type. |
| Attribute list | List of the attributes that are associated with this event type. |
| Key list | List of the keys that pertain to this event type. |
| *Terminator - list of data objects for each defined terminator event, including:* | |
| Terminator description | |
| Cluster description | Description of the cluster to which a lifespan terminated by this terminator belongs. |
| Conditions | Conditions that a possible terminator must satisfy in order to terminate the lifespan. |
| Quantifier | First, last, each. |
| Termination type | Terminate, discard. |
| *Initiator - list of data objects for each defined initiator event, including:* | |
| Initiator description | |
| Cluster description | Description of the cluster to which a lifespan initiated by this initiator belongs. |

TABLE VI-continued data structures

| | |
|---|---|
| Conditions | Conditions that a possible initiator must satisfy in order to initiate the lifespan. |
| Correlation code | Add, ignore, override or replace. Cluster - for each cluster of lifespans: |
| Key value table | Mapping of key values to a linked list of lifespans. For each global key value, the table lists lifespans that have this global key value and thus belong to the same cluster. The global key value determines the grouping of lifespans and their respective initiators. |
| Links set | Set of lifespans that are associated with this cluster. Lifespan |
| Key value table | Mapping of local key values to data used for composition of candidates (event instances) with that key value. For each local key value, the table lists the operands that have this local key value in the given lifespan. |

Figure 3:
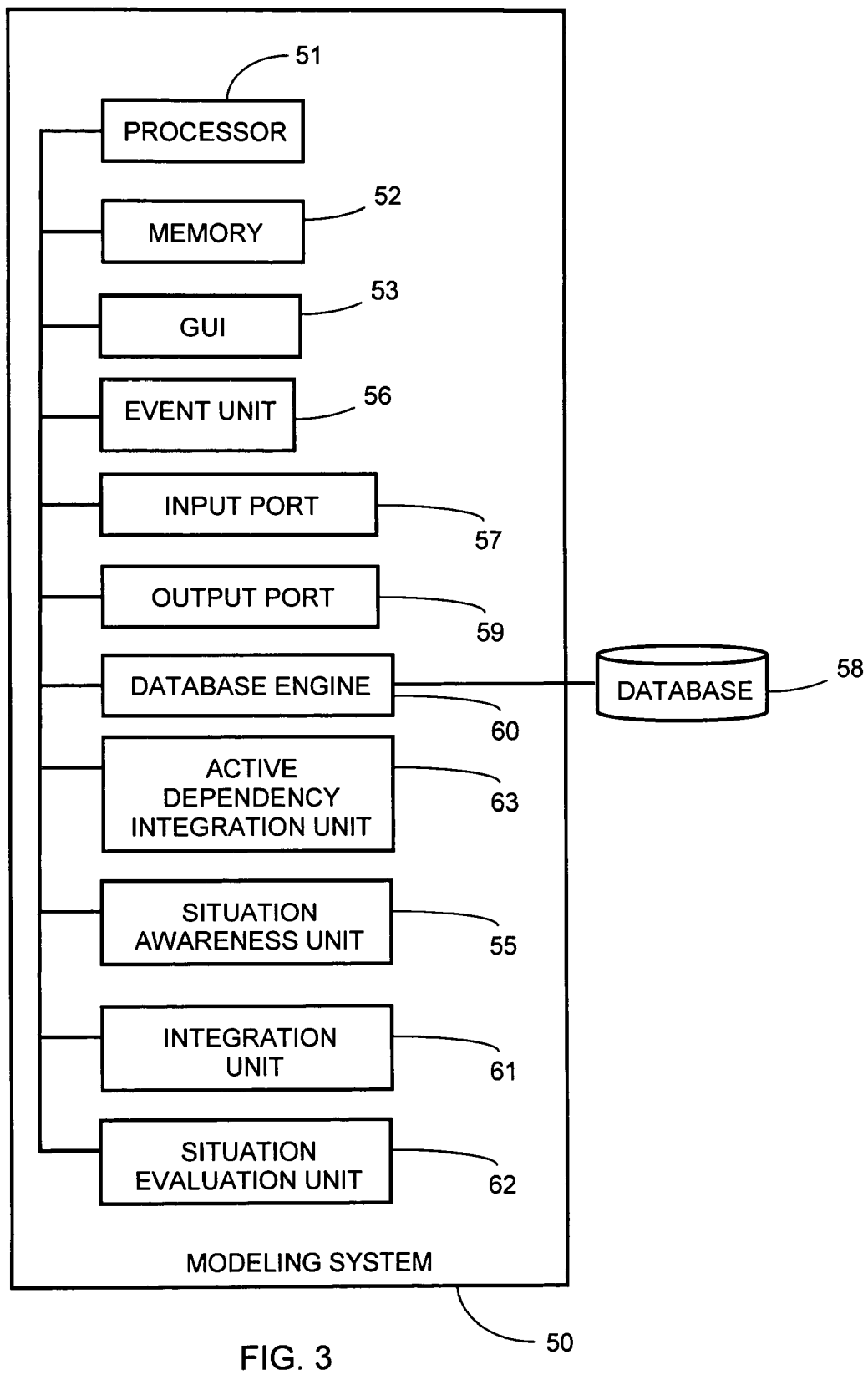
FIG. 3 is a block diagram showing functionally a modeling system for modeling entities and business components according to the invention.

FIG. 3 is a block diagram showing functionally a modeling system depicted generally as 50 according to the invention for modeling entities and business components. The modeling system 50 includes a processor 51 that is coupled to a memory 52 storing computer program code in accordance with which the modeling system 50 operates as well as data created thereby. A Graphical User Interface (GUI) 53 coupled to the processor 51 and operating in conjunction therewith allows a user to define event types, business component types, and dependency types associated with a business domain and rules that describe how an event affects a business component. The GUI 53 also allows rules to be defined that describe when a change in a business component triggers an event as well as the modeling of business components and dependencies between them including compound dependencies. The GUI 53 further allows for the definition of rules that describe how information is propagated from one business component to another according to a defined dependency model.

Coupled to the processor 51 and responsive to data stored in the memory 52 is a situation awareness unit 55 that is responsive to one or more events and/or and constraints violations for creating new situations. The situation awareness unit 55 may operate in accordance with the principles described above with reference to FIGS. 1 and 2; and in the following description it will be assumed that such a system is used and the syntax in accordance with which rules and events are defined and propagated to the situation awareness unit 55 will conform to such a system. However, it is to be noted that this is by way of example only and other situation awareness systems can be employed, providing that the syntax of the data created by the GUI 53 is adapted for use therewith.

The modeling system 50 further includes an event unit 56 for receiving one or more input events via an input port 57 to which events may be fed and to which an external database 58 may be coupled. An output port 59 allows the modeling system 50 to be coupled to an external device, such as a computer that is responsive to a desired situation being detected by the modeling system 50. A database engine 60 is coupled to the event unit 56 for querying the external database 58 for obtaining auxiliary data, and an integration unit 61 coupled to the event unit 56 and to the database engine 60 integrates the input event or events with the auxiliary data for establishing occurrence of a composite event, defining the situation. A situation evaluation unit 62 evaluates whether the composite event corresponds to the predetermined situation and, as noted above, may be fed to an external device via the output port 57.

An active dependency integration unit 63 is coupled to the processor 51 and receives as input events that, together with dependencies between business components, are to be processed in order to monitor the impact of events on business components and the propagated impact between business components. The active dependency integration unit 63 responds to situations output by the situation awareness unit 55 to automatically update business components information, and to propagate changes in business components to other business components according to the dependency model. Situations constructed by the situation awareness unit 55 can be used as events in the active dependency integration unit 63. Conversely, events triggered in response to a change in business components as determined by the active dependency integration unit 63 can be used in the situation awareness unit 55 to compose situations.

Figure 4:
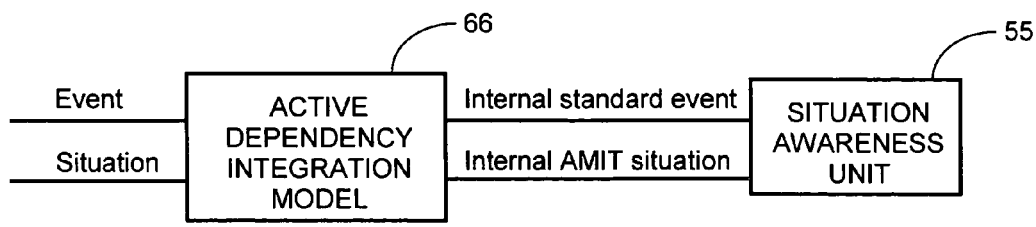
FIG. 4 is a block diagram showing functionally the inter-relationship between the business model and the situation awareness unit of FIG. 3.

FIG. 4 is a block diagram showing functionally the inter-relationship between a business model depicted 66 and the situation awareness unit 55 of FIG. 3. AMIT situation describes the logic of a single simple dependency type, which is performed for every dependency according to the dependency id (key). It is evaluated from the creating of the dependency until it is terminated (lifespan) and considers state changes in any source business component in the dependency (operands).

Dependencies are generated when their first targets are detected upon loading a new model into the modeling system 50. Each dependency is given a unique id that will identify it throughout the execution. The generation of a new dependency is a three-stage process. It should be noted that for each dependency type there is an AMIT situation definition with a lifespan definition and operands. The situation will determine when and how to affect the targets of the dependency according to the sources' state. Lifespans are keyed by the dependency id in other words determining situations for each dependency will be done in a different lifespan. Each operand of the situation will represent the state of a source of the dependency.

Table VII shows the AMIT mandatory dependency definition:

TABLE VII

AMIT mandatory dependency definition

```
<eventType name="mandatory_start" extends="AmitEvent">
    <attributeType name="dependency_id" xsi:type="integer"/>
    <reference name="mandatory_1" semantics="influence-on">
        <derivation name="dependency_id"
expression="mandatory_start.dependency_id"/>
    </reference>
    <reference name="mandatory_2" semantics="influence-on">
        <derivation name="dependency_id"
expression="mandatory_start.dependency_id"/>
    </reference>
</eventType>
<key name="dependency_id">
    <keyExpression xsi:type="integer"/>
    <eventKey eventType="mandatory_start">
        <keyAttribute attribute="dependency_id"/>
    </eventKey>
    <eventKey eventType="mandatory_1">
        <keyAttribute attribute="dependency_id"/>
    </eventKey>
    <eventKey eventType="mandatory_2">
        <keyAttribute attribute="dependency_id"/>
    </eventKey>
    <eventKey eventType="mandatory_initiate">
        <keyAttribute attribute="dependency_id"/>
    </eventKey>
</key>
<lifespan name="mandatory_lifespan">
```

TABLE VII-continued

AMIT mandatory dependency definition

```
<initiator>
    <eventInitiator name="mandatory_start" as="init"/>
</initiator>
<terminator>
    <noTerminator/>
</terminator>
<keyBy name="dependency_id"/>
</lifespan>
<situation lifespan="mandatory_lifespan" name="mandatory">
    <report detectionMode="immediate" repeatMode="always"
            where="sum>=1000">
        <operandReport eventType="mandatory_1"
                max=expression(STATE) override="true"
                partMax="true" quantifier="last" retain="true"/>
        <operandReport eventType="mandatory_2"
                max=expression(STATE) override="true"
                partMax="true" quantifier="last" retain="true"/>
        <operandReport addToSum="true" as="initiator"
                eventType="mandatory_initiate"
                override="true" quantifier="first" retain="true"
                sum="1000"/>
    </report>
    <situationAttribute attributeName="dependency_id"
            expression="key(dependency_id)"/>
    <situationAttribute attributeName="STATE"
            expression=expression(max)/>
</situation>
``` a) The first stage is to start the detection window or lifespan by sending a lifespan initiator event to the situation awareness unit 55 including the dependency id and to initialize the operands (sources of the dependency) of the situation. Initializing the operands means to set the situation definition such that it reflects the status of the targets of the dependency as if there were no sources.

TABLE VIII

Events created at the first stage mandatory_start;      dependency_id=1
mandatory_1; dependency_id=1;STATE=null
mandatory_2; dependency_id=1;STATE=null b) Since the start event, in Table VII, references two other events, having the role of initializing situations' operands by setting the STATE attribute to null, the three events in Table VIII are sent to AMIT.

c) The second stage is to acquire the status of the existing sources in the dependency by sending an event to AMIT for each source including the dependency id, place of the source in the dependency and the status of the source. For example, if both of the dependency sources exist and both were in a state called "state_ok" then the following events would be created:

TABLE IX

Events created at the second stage mandatory_1; dependency_id=1;STATE=state_ok
mandatory_2; dependency_id=2;STATE=state_ok d) The third stage is to activate the situation definition, in other words, from this point on the detection process of the situation should begin. Table X is an example of an event that activates the situation detection because in the definition the where clause is a condition on the situation variable sum and until this variable is not set to above 1000 (which this event does) the situation won't be detected.

TABLE X

Event created at the third stage mandatory_initiate;      dependency_id=1;

As a result, the situation in Table XI will be detected.

TABLE XI

Situation detection after the three stages mandatory;      dependency_id=1;STATE=state_ok e) The modeling system 50 captures this detection, retrieves the dependency according to the dependency id reported and updates the targets of the dependency according to the state reported.

Processing the dependency after it has been generated is a similar process except that there is no need to start and activate the underlying situation. It is enough to send events that report the current status of a source just like in the second stage of generation and if the situation is detected due to this change then the status of targets will be updated.

Integration of the Invention with Real Systems

The modeling system 50 is event driven meaning that events will drive the execution of change in the given model. In the preferred embodiment, the model is an XML format that is loaded on startup under control of suitable APIs.

The modeling system 50 has an adapter interface for feeding it with events. This interface can be implemented differently to allow any system to interact with the modeling system 50. The same mechanism is applied to events reported by the modeling system 50 to an external system. Implementation of the adapter can be to receive events in different formats such as XML (Extensible Markup Language), flat format (e.g. text files where data is separated by delimiters such as spaces or commas) and SOAP (Simple Object Access Protocol) messages. Part of the implementation is to describe how the events are received, for example through JMS (Java Messaging Service) messages or through IBM's messaging software, MQ that is used to transfer messages (including events) between applications/computers. A new approach for sharing events among different components is the Event Bus mechanism. In this case, a different implementation of the adapter interface allows the modeling system 50 to "listen" to the event bus for events relevant to the execution of the model.

Figure 5:
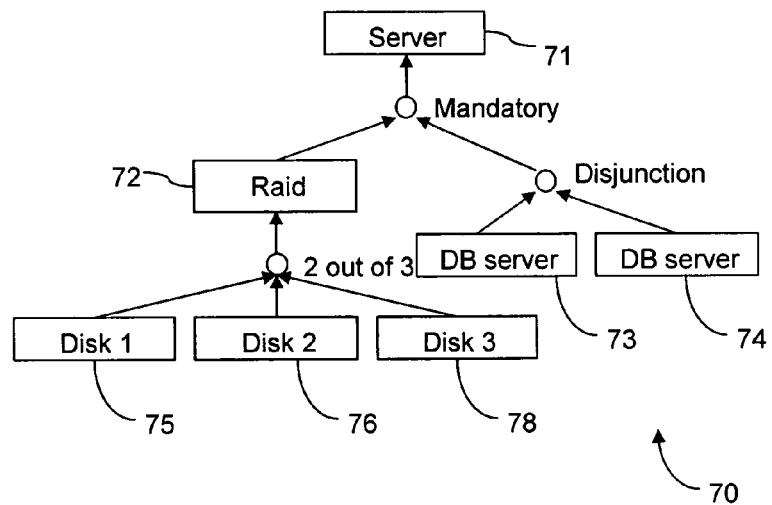
FIG. 5 is a schematic representation of a business model that may be optimized according to the principles of the invention.

FIG. 5 is a schematic representation of a business model denoted as 70 that may be optimized according to the principles of the invention. Thus, the model 70 shows a server n that requires both a raid 72 and one of two database servers 73 and 74. The raid 72 requires that two out of three disks 75, 76 and 78 are available. The dependency between the server 71 and the database servers 73, 74 is a compound dependency. It is composed of the simple dependency types mandatory and disjunction.

When an event that reports on failure of the first disk 75 occurs, the raid 72 continues to function correctly and so does the server 71. However, when in addition an event that reports on failure of the second disk 76 or of the third disk 78 occurs, the raid 72 fails and as a result the server n fails.

In order to model the business configuration shown in FIG. 4 and process the events corresponding to respective disk failures, the invention provides a proprietary rule language that interfaces with the situation awareness unit 55 shown in FIG. 3, so as to allow the events to be processed and provide feedback about the business model.

Rule Language:

According to an exemplary embodiment of the invention, the modeling system 50 uses an XML language that enables the definition of:
1. The business domain: event types, business component types, and dependency types.
2. Rules that describe how an event affect a business component
3. Rules that describe when a change in a business component triggers an event.
4. Description of business components and dependencies between them, including compound dependencies.
5. Rules that describe how information is propagated from one business component to another according to dependencies between them.

Efficient Execution Model

The active dependency integration unit 63 receives event information and reports about changes in business components. When an event arrives to the active dependency integration unit 63:
1. The active dependency integration unit 63 finds the effect of the event on a business component, i.e., the change in a business component's state (e.g. a server becomes unavailable if the event server utilization reports on utilization that is higher than 90 percent).
2. If an event changes a business component state then the active dependency integration unit 63 discovers how the change in one business component state propagates to other business components according to the business model.

Dependency semantics is expressed using rules that conform to the situation awareness unit 55. This allows customization of the rules used by the active dependency integration unit 63 so as conform to an off-the-shelf situation awareness unit, such as that sold under the name AMIT by International Business Machines Inc. of Armonk, N.Y., USA. In order to calculate state propagation the active dependency integration unit 63 uses the predefined rules and engine of the situation awareness unit 55.

a. When a business component state changes the active dependency integration unit 63 creates an event that includes the following information and sends it to an internal engine of the situation awareness unit 55:
      The dependency ID—for each dependency in the model the active dependency integration unit 63 holds an internal ID.
      The place of the affected business component in the dependency—for each business component that participates in a dependency the active dependency integration unit 63 holds an internal ID that aims at supporting dependencies that consider order of entities.
      New state information
   b. When a situation is detected by the situation awareness unit 55:
      the active dependency integration unit 63 identifies the dependency that is reported by the situation;
      the active dependency integration unit 63 identifies the target entities of this dependency;
      the active dependency integration unit 63 updates state information of these entities. If state information changes then the previous step is repeated.
      If required, the active dependency integration unit 63 signals an event to the outside world to report about propagated state changes (the situation of the active dependency integration unit 63).

A compound dependency is treated as a virtual entity for the purpose of identifying state propagation (e.g. in the example above the mandatory dependency has two sources, a raid and a virtual entity representing the disjunction dependency; the disjunction dependency is a virtual entity representing the mandatory dependency result).

Dependency Semantics Change

The following is a situation definition of a dependency called mandatory that is used by the situation awareness unit 55.

The semantics of the dependency is as follows:

The targets of the dependency will be ok if all the sources are ok.

If one of the sources fails all the targets fail.

Since the dimension of the state value might be bigger then two, the precise semantic is as follows:

The targets' state will be the worst state of the sources.

If the state value dimension is [1, 5] where the worst state is 5 then the targets state value will be the maximum value from all the sources. It should be noted that the operands have the override attribute set true meaning that when a new event arrives it will override the previously reported state value for calculating the maximum value of the situation. Here the receiving attribute of the dependency is STATE and the reporting attribute is also STATE.

When the situation awareness unit 55 is the above-mentioned AMIT engine provided by IBM, this is represented by a set of rules that may be expressed in XML as follows:

```
<situation lifespan="mandatory_lifespan" name="mandatory">
    <report detectionMode="immediate" repeatMode="always"
where="sum>=1000">
        <operandReport eventType="mandatory_1" max=" STATE"
override="true"
            partMax="true" quantifier="last" retain="true"/>
        <operandReport eventType="mandatory_2" max="STATE"
override="true"
            partMax="true" quantifier="last" retain="true"/>
        <operandReport eventType="mandatory_3" max="STATE"
override="true"
            partMax="true" quantifier="last" retain="true"/>
        <operandReport eventType="mandatory_4" max="STATE"
override="true"
            partMax="true" quantifier="last" retain="true"/>
        <operandReport addToSum="true" as="initiator"
eventType="mandatory_initiator"
            override="true" quantifier="first" retain="true"
            sum="1000"/>
    </report>
    <situationAttribute attributeName="dependency_id"
expression="key(dependency_id)"/>
    <situationAttribute attributeName="STATE" expression="max"/>
</situation>
```

As noted above, the above syntax is specific to the situation awareness unit 55 being AMIT. However, the primitives such as lifespan, repeatMode, quantifier and so on have been described above and are tabulated in Tables II, III and IV. If other situation awareness units are employed, similar functionality would be provided to enable the above situation to be properly defined.

The semantics of the mandatory dependency might be different. For example it might state that all the targets of the dependency should be in the best state of all the sources meaning that some entity is still ok as long as at least one of the entities it depends on is ok. The changes to the situation in this case would be to calculate the minimal value of all the sources' state attribute. The situation after the changes will look like this:

```
<situation lifespan="mandatory_lifespan" name="mandatory">
    <report detectionMode="immediate" repeatMode="always"
where="sum>=1000">
        <operandReport eventType="mandatory_1" min=" STATE"
override="true"
            partMin="true" quantifier="last" retain="true"/>
``` mandatory. In addition there are two roles, the first states that the event status_change has an affect on a WAS server by updating its status and the second states that upon status change of an application the event application_status is triggered.

The formal declaration of the model formatted for use with the situation awareness unit 55 as described above has the following format:

```
dependency:     name=mandatory          id=1
    target:     entity type=application
                attribute:      name=name       value=Authorization
                attribute:      name=state      value=state_ok
    target:     entity type=application
                attribute:      name=name       value=Stock Trade
                attribute:      name=state      value=state_ok
    source:     entity type=server      place=3
                attribute:      name=name       value=DB2 Server
                attribute:      name=state      value=state_ok
    source:     entity type=server      place=2
                attribute:      name=name       value=Edge Server
                attribute:      name=state      value=state_ok
    source:     dependency=2_outof      id=2
    target:     dependency=mandatory    id=1
    source:     entity type=server      place=1
                attribute:      name=name       value=WAS3
                attribute:      name=state      value=state_ok
    source:     entity type=server      place=2
                attribute:      name=name       value=WAS1
                attribute:      name=state      value=state_ok
    source:     entity type=server      place=3
                attribute:      name=name       value=WAS2
                attribute:      name=state      value=state_ok
effect:         type=update         event=status_change     entity=server
    condition=status_change.server_name=server.name
    derivation:     name=server.state       expression=status_change.state
effect:         type=trigger        event=application_status
    entity=application
    derivation:         name=application_status.state
    expression=application.state
    derivation:         name=application_status.app_name
    expression=application.name
```

-continued

```
        <operandReport eventType="mandatory_2" min="STATE"
override="true"
            partMin="true" quantifier="last" retain="true"/>
        <operandReport eventType="mandatory_3" min="STATE"
override="true"
            partMin="true" quantifier="last" retain="true"/>
        <operandReport eventType="mandatory_4" min="STATE"
override="true"
            partMin="true" quantifier="last" retain="true"/>
        <operandReport addToSum="true" as="initiator"
eventType="mandatory_initiator"
            override="true" quantifier="first" retain="true"
            sum="1000"/>
    </report>
    <situationAttribute attributeName="dependency_id"
expression="key(dependency_id)"/>
    <situationAttribute attributeName="STATE" expression="min"/>
</situation>
```

EXAMPLE

Figure 6:
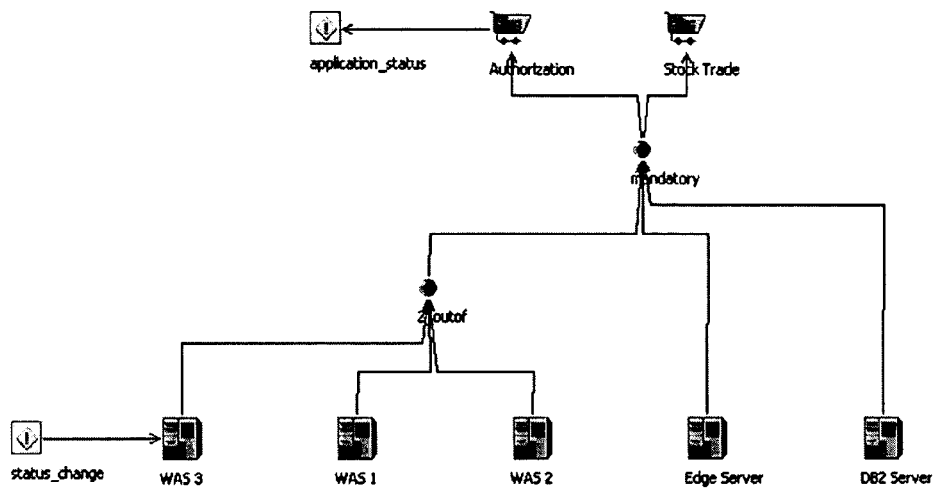
FIG. 6 is a graphical representation of a first business model created using the modeling system of FIG. 3.

FIG. 6 shows graphically a model of a business hierarchy created using the GUI 53 and depicted generally as 80. The model 80 shows three Websphere Application Servers denoted WAS1, WAS2 and WAS3, an Edge server a DB2 server and two applications—Authorization and Stock trade. For the applications to perform properly two out of the three WAS servers together with the Edge and DB2 servers are mandatory.

The above example is used to describe the flow of events that occurs when the modeling system 50 receives new input. In the following sequence the input is the occurrence of the event status_change with attributes server_name=WAS3 and state=state_fail.

1. Upon detection of this event by the modeling system 50 and going over the effects, the modeling system 50 concludes that the event has an update effect on the WAS server named WAS3 and therefore its attributes are changed according to the derivations declared for the effect. In this case there is one derivation stating that server.state=status_change.state and so WAS3 is in state fail.

2. Since WAS3 is a source in the 2_outof dependency, the 2_outof dependency needs to be notified of the server's status change by creating the event 2outof_1 dependency id=2 state=state_fail. The suffix of the event name is 1 because the place of WAS3 is 1 in this dependency.

3. The situation manager will detect the 2outof situation and will create the event 2outof dependency id=2 state=state_fail.

4. The modeling system 50 receives the event thus created and starts updating the targets of the 2_outof dependency. Since the only target is the dependency mandatory and it needs also to be notified by the status change, the modeling system creates the event mandatory_1 dependency id=1 state=state_fail. The suffix of the event name is 1 because the place of 2_outof is 1 in the mandatory dependency.
5. The situation manager will now detect the mandatory situation and will create the event mandatory dependency id=1 state=state_fail.
6. The modeling system 50 receives the event thus created and starts updating the targets using the derivations declared in the mandatory dependency for each target. In this case the value of the state attribute of both applications is the value of the reporting attribute state of the dependency.
7. Since the application Authorization status was changed the trigger effect is now relevant and the modeling system will now create the event application_status. The event attributes are set using the derivations declared for this rule.

Multiple Domains

Figure 7:
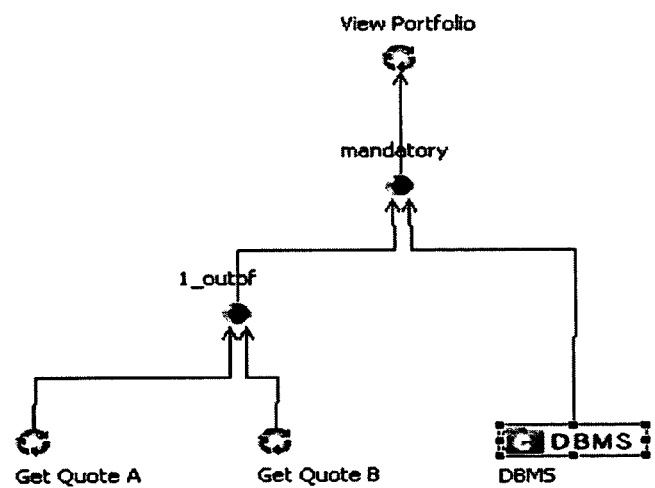
FIG. 7 is a graphical representation of a second business model created using the modeling system of FIG. 3.
Figure 8:
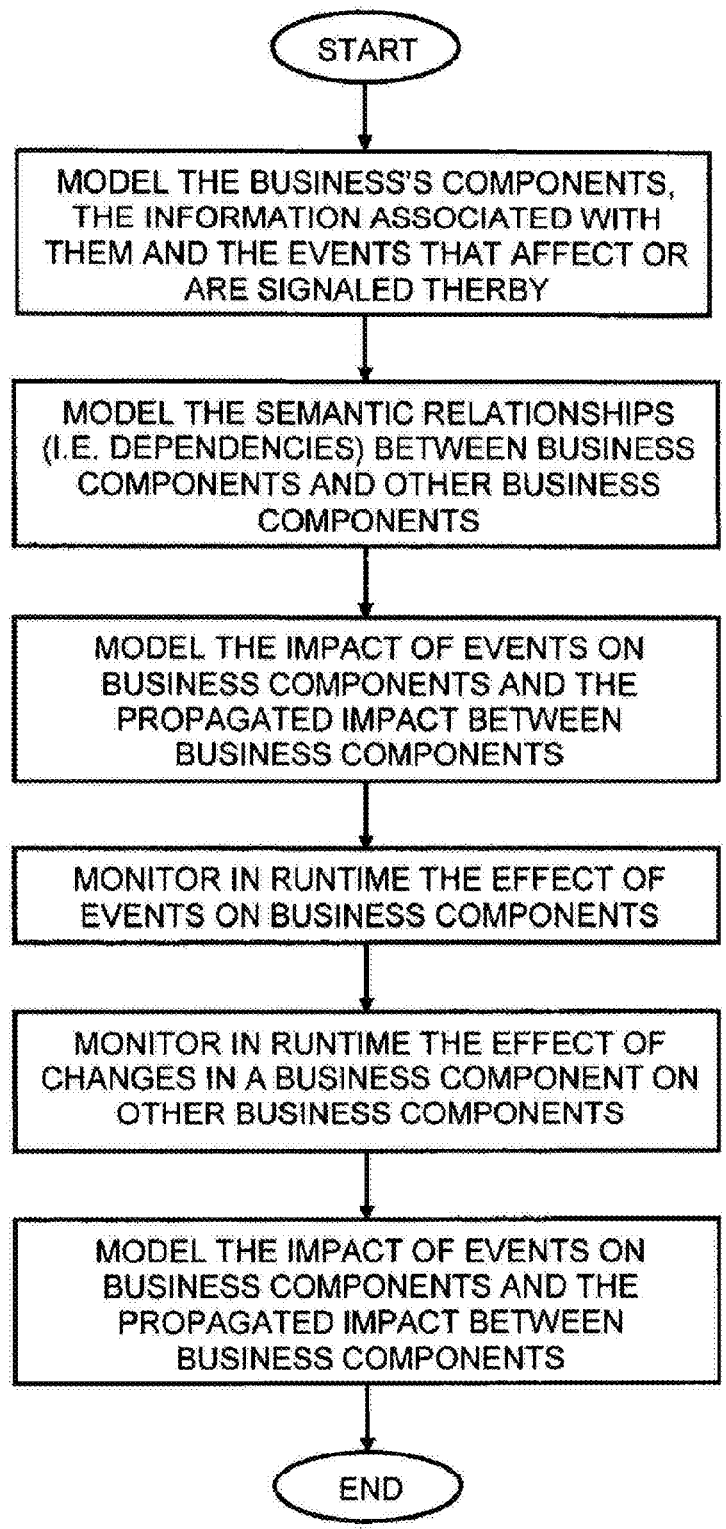
FIG. 8 is a flow diagram showing the principal operating steps carried out by the modeling system shown in FIG. 3.

FIG. 7 is a pictorial representation of a model 90 created for different domains, of a web service environment where services are dependent on other services. The portfolio service enables a user to view and manage his portfolio. To supply this functionality for the user, this service uses backend facilities (in this case just a database management service) and external web services (in this case just a service that reports on the current value of a stock given its symbol name). There are actually two "get quote" services that the portfolio service can work with. For the portfolio service to work properly, one of the "get quote" service should be working properly together with the database.

The manner in which dependencies are defined is as described above with reference to FIG. 4 of the drawings.

It will be apparent that modifications may be made to the specific implementation without departing from the scope of the invention as defined in the appended claims. For example, while use of XML is described for defining the business dependency model, it will be appreciated that while this enhances portability, the invention can equally well employ other languages.

It will also be understood that the modeling unit according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters and Roman numerals used to designate claim steps are provided for convenience only and do not imply any particular order of performing the steps.

The invention claimed is:

1. A method for processing information, comprising:
in a system comprising one or more processors, providing an active dependency integration unit, comprising a first program module that receives as input first events for processing together with a definition of dependencies between business components in a business model in order to monitor a propagated impact between the business components;
providing in the system a situation awareness unit, comprising a second program module that detects situations comprising specified combinations of second events and conditions;
receiving in the active dependency integration unit a first event relating to at least a first business component;
responsively to the first event and to the dependencies, propagating a change to at least a second business component;
passing a second event indicative of the change to the situation awareness unit;
responsively to the second event, detecting a situation in the situation awareness unit;
responsively to the situation, conveying a third event from the situation awareness unit to the active dependency integration unit; and
outputting a functional state of the business model responsively to at least the third event.

2. The method according to claim 1, further including receiving as input event types, business component types, and dependency types associated with a business domain.

3. The method according to claim 1, further including receiving as input rules that describe how a given event affects a specified business component.

4. The method according to claim 1, further including receiving as input rules that describe when a change in a business component triggers an event.

5. The method according to claim 1, wherein the definition includes predefined dependency type semantics.

6. The method according to claim 5, wherein said dependency type semantics include a mandatory logical operator that logically couples one or more source components of the dependency to one or more targets of the dependency and sets the targets to a worst state of the source components.

7. The method according to claim 5, wherein said dependency type semantics include an "N out of M" logical operator, wherein N is less than M, that logically couples M source components of the dependency to one or more targets of the dependency and sets the targets to ok if at least N of the source components are ok and otherwise sets the targets to "fail".

8. A computer software product, including a computer-readable storage medium in which computer program instructions are stored, wherein the instructions comprise distinct software modules including an active dependency integration unit and a situation awareness unit, and when executed by a processor, the instructions cause the processor to perform a method for processing information, comprising:
detecting in the situation awareness unit situations comprising specified combinations of events and conditions relating to a business model, the conditions comprising an order of occurrence and temporal relationships among the events;
receiving as input in the active dependency integration unit events relating to business components in the business model, for processing together with a definition of dependencies among the business components in order to monitor a propagated impact of the events among the business components, including receiving a first event relating to a first business component;
responsively to the first event and to the dependencies, propagating a second event indicative of a change to at least a second business component, wherein the dependencies between the first business component and the second business component comprise a compound dependency having two different simple dependency types;
passing the second event to the situation awareness unit;
responsively to the second event, detecting a situation in the situation awareness unit;
responsively to the situation, conveying a third event from the situation awareness unit to the active dependency integration unit; and outputting a functional state of the business model responsively to at least the third event.

9. The computer software product according to claim 8, wherein the simple dependency types are a mandatory dependency and a disjunctive dependency.

10. A method for processing information, comprising:

executing in a processor distinct program modules including an active dependency integration unit and a situation awareness unit to cause the processor to perform the steps of:

detecting in the situation awareness unit situations comprising specified combinations of events and conditions relating to a business model, the conditions comprising an order of occurrence and temporal relationships among the events;

receiving as input in the active dependency integration unit events relating to business components in the business model, for processing together with a definition of dependencies among the business components in order to monitor a propagated impact of the events among the business components, including receiving a first event relating to a first business component;

responsively to the first event and to the dependencies, propagating a second event indicative of a change to at least a second business component, wherein the dependencies between the first business component and the second business component comprise a compound dependency having two different simple dependency types;

passing the second event to the situation awareness unit;

responsively to the second event, detecting a situation in the situation awareness unit;

responsively to the situation, conveying a third event from the situation awareness unit to the active dependency integration unit; and outputting a functional state of the business model responsively to at least the third event.

11. The method according to claim 10, wherein the simple dependency types are a mandatory dependency and a disjunctive dependency.

\* \* \* \* \*